United States Patent [19]
Barnes et al.

[11] 3,717,695
[45] Feb. 20, 1973

[54] PROCESS FOR PREPARING TEXTURED FILLED OLEFIN POLYMER EXTRUSIONS

[75] Inventors: Estil N. Barnes; Harold T. Collins, both of Bartlesville, Okla.

[73] Assignee: Phillips Petroleum Company

[22] Filed: Oct. 28, 1970

[21] Appl. No.: 84,914

[52] U.S. Cl............264/90, 260/41 A, 260/41 R, 264/102, 264/132, 264/209, 264/211, 264/237
[51] Int. Cl......B29c 17/04, B29c 25/00, B29d 23/03
[58] Field of Search......264/209, 210, 131, 132, 211, 264/237, 22, 288, 289, 90, 101, 102; 260/41 A, 41 R

[56] References Cited

UNITED STATES PATENTS

| | | | |
|---|---|---|---|
| 2,528,200 | 10/1950 | Weinberg | 264/209 |
| 3,066,356 | 12/1962 | Porter | 264/211 |
| 3,182,108 | 5/1965 | Branscum | 264/209 |
| 3,017,339 | 1/1962 | Dewey | 264/22 |
| 2,904,844 | 9/1959 | Smithies | 264/211 |
| 3,221,086 | 11/1965 | Wells | 264/90 |

FOREIGN PATENTS OR APPLICATIONS

| | | | |
|---|---|---|---|
| 573,749 | 4/1959 | Canada | 264/211 |

*Primary Examiner*—Robert F. White
*Assistant Examiner*—Jeffrey R. Thurlow
*Attorney*—Young and Quigg

[57] ABSTRACT

A textured extruded article which can be decorated to a wood-like finish is made by extruding and vacuum sizing a filled resin of olefin polymer which has adsorbed up to about 0.25 percent by weight of water. The texturized extruded articles can be used as a wood substitute in furniture, paneling, and the like.

7 Claims, No Drawings

PROCESS FOR PREPARING TEXTURED FILLED OLEFIN POLYMER EXTRUSIONS

BACKGROUND OF THE INVENTION

This invention is related to a process for producing articles from olefin polymers. In one of its aspects this invention relates to producing textured articles from olefin polymers and more particularly to the production of articles with a wood-like finish. In another of its aspects this invention relates to articles composed of olefin polymers which also contain a hygroscopic filler. In still another of its aspects this invention relates to extruding moisture containing filled olefin polymers. In still another of its aspects this invention relates to vacuum sizing extruded olefin polymers.

In one concept of this invention it relates to producing an olefin polymer that will readily pickup and retain moisture by adding a hygroscopic filler to the polymer. In another of its concepts this invention relates to the production of a textured surface on an article made of olefin polymer by assuring that the polymer contains moisture before extrusion and by following the extrusion with a vacuum sizing operation. In still another of its concepts this invention relates to producing a wood-like grain in an extruded article made of olefin polymer which contains moisture by vacuum sizing the extrudate. In still another of its concepts a wood-like surface finish is produced on an extruded and vacuum sized article made of moisture containing olefin polymer by staining the wood-like grain with an appropriate wood stain.

The problem of extruding olefin polymers which contain water are well known. The production of puffed, streaked, and milky articles has resulted in the exclusion of water to the greatest degree possible in the usual processing step of olefin polymers. We have found, however, that by a combination of the techniques of extrusion and vacuum sizing a controlled amount of water in a filled olefin polymer will produce a highly decorative and therefore useful product which can be substituted for wood surfaces where a combination of the aesthetic qualities of wood and the practical qualities of olefin polymer surfaces are desired.

It is therefore an object of this invention to produce a decorative, grained surface on an article produced from olefin polymer. It is another object of this invention to provide a method whereby a controlled amount of water can be easily absorbed and retained on an olefin polymer. It is another object of this invention to produce a molded article of olefin polymer that simulates the appearance of wood.

Other aspects, concepts and objects of the invention are apparent from a study of this disclosure and the appended claims.

SUMMARY OF THE INVENTION

According to the present invention there is provided a method for producing polyolefin articles with a textured surface comprising:

a. extruding a water containing filled olefin polymer; and b. vacuum sizing the extruded article while still at least partially molten to produce a grained pattern on the surface of the article.

In another embodiment of the invention, a method is provided for producing polyolefin articles having a textured surface comprising:

a. adding a hygroscopic filler to the olefin polymer;

b. adsorbing up to about 0.25 per cent by weight of water onto the filled olefin blend;

c. extruding a water containing filled olefin polymer; and d. vacuum sizing the extruded article while still at least partially molten to produce a grained pattern on the surface of the article.

In another embodiment of this invention on the grained surface article produced by vacuum sizing the extruded water containing, filled, olefin polymer is stained with a wood stain to produce a surface that simulates the appearance of wood. Any olefin polymer having a melt index between 0.1 and 0.8 preferably between 0.2 and 0.5 and a density of about 0.920 to about 0.980, preferably between 0.940 and 0.960 is suitable for use in this invention. The olefin polymers preferred for the use in this invention are homopolymers and copolymers of olefins having two to six carbon atoms such as polyethylene, polypropylene, polybutene, ethylene-butene copolymers, ethylene-hexene copolymers, and the like. At present homopolymers and copolymers of ethylene, propylene, and butene are most preferred.

These resins are blended with sufficient hygroscopic filler to enable them efficiently to adsorb and retain water. The amount of filler blended with the resins is in the range of from about 0.5 to about 4 percent filler by weight based on the total blend, preferably from about 1.5 to about 3 per cent filler by weight based on the total blend.

The hygroscopic fillers according to this invention are preferably carbon black, finely divided silica, hydrated alumino-silicates, clays such as kaolin or attapulgite or talc. Other hygroscopic materials may be used but those listed are presently preferred.

The blend of resin and hygroscopic filler suitable for extrusion and vacuum sizing will contain from about 0.05 to about 0.25 per cent water by weight based on the total blend, preferably from about 0.07 to 0.1 per cent water by weight based on the total blend. This water may be supplied as water vapor to the blend during extrusion or the resin-filler mixture may be kept in storage in a humid environment (above a relative humidity of 60 per cent) until the blend has adsorbed sufficient moisture.

The operation of extrusion and conditions for extrusion of the polymers used in this invention are well known in the art and are discussed here only to point out that the extrudate produced by the process of this invention can be sheets of material or any shaped article that is of a thickness below a specified maximum. The thickness of the article is, at present, restricted to allow proper cooling to prevent fracture of the article in the process of vacuum sizing, the process by which the surface of the article develops the characteristic texture that simulates wood grain. Circular, rectangular or other elongated shapes can be successfully produced by making the extrudate hollow and keeping the wall thickness within the specified limit.

In the usual vacuum sizing operation a partially molten extrudate is passed across the face of a porous sizing element where because of reduced pressure produced inside the sizing element the extrudate is pulled against the sizing elements surface to conform to the shape of the surface as the extrudate is continuously moved across the surface and cools. This type operation is especially effective in producing tubes where the outside size is important, but is also applicable to the production of sized sheets of extrudate. The vacuum element can be used alone or in conjunction with an external source of cooling. Very often in the production of sized tubing a coolant is passed through the hollow center of the extrudate as the outside surface of the extrudate is passed across the vacuum sizing surface. With a sheet material the coolant can be applied to the face of the sheet opposite the side to which the vacuum is applied.

In the vacuum sizing operation of the process of this invention on the extruded olefin polymer containing filler and water is passed across a porous sizing element through the pores of which a vacuum is being drawn. The action of the vacuum on the still at least partially molten extrudate is to draw the moisture to the surface of the extrudate where it is entrapped between the surface of the extrudate and the sizing element until it is evaporated and carried away into the vacuum. The variation in size and shape of the pocks and striations created on the surface of the extrudate depends on the efficiency of the vacuum in evaporating the moisture in relation to the speed of travel of the extrudate against the sizing element and rate of cooling of the extrudate which causes retention of the textured appearance of the extrudate surface.

There is a limitation on the thickness of the article that can be effectively vacuum sized by the process of this invention. This limitation can be expressed as the thickness which will allow the specific material processed to cool without fracture from internal stresses while being vacuum sized either with or without the use of an external coolant. A practical limitation at present is a thickness of about 1 inch.

After vacuum sizing has produced the characteristic texturized surface of the process of this invention, its surface can be treated with chromic acid, corona discharge, a flame treatment, or the like, for increasing adhesion of a coating to the surface.

Although the surface of the extruded article, either treated or untreated for increased adhesion of an applied coating, can be coated with varnishes, lacquers or stains of many kinds and colors, by the process of this invention the most appropriate coating consists of a varnish stain of oak, walnut, mahogany or other appropriate wood stain.

The following is a specific example showing the production of a textured article of an olefin polymer by the process of this invention. This example is meant to be illustrative and not exclusive.

EXAMPLE I

A blend of polyethylene homopolymer with a melt index of 0.3 and a density of 0.95 and 2.5 per cent by weight carbon black HAF Furnace Black (Philblack A), Phillips Petroleum Company.) was stored at a 70 per cent relative humidity for 3 days. The blend had an adsorbed water content of 0.083 weight per cent. The blend was then extruded into a 1-inch diameter pipe with a 0.25 inch wall thickness using vacuum sizing technique. A portion of this pipe was flame treated and given a varnish stain on its outer surface which resulted in a section resembling oak wood.

Reasonable variation and modification are possible within the scope of the foregoing disclosure and the appended claims of the invention the essence of which is that there is provided a method for producing a textured surface on an article made of olefin polymer by extruding and vacuum sizing a moisture containing olefin polymer blended with hygroscopic filler.

We claim:

1. A method for producing surface-textured articles of olefin polymer, said method comprising:
    1. extruding a filled olefin polymer containing absorbed water in a range up to about 0.25 percent by weight of the filled olefin polymer across a vacuum sizing element to produce a shaped extrudate of thickness in a range that will allow cooling of the extrudate without fracture,
    2. drawing moisture to the surface of the extrudate as it moves across said vacuum sizing element to produce a textured surface, and
    3. cooling said extrudate as it moves across said vacuum sizing element sufficiently to retain the surface texturizing.

2. A method for producing surface-textured articles of olefin polymer according to claim 1 wherein said water containing, filled, olefin polymer is prepared by adding a hygroscopic filler selected from the group consisting of carbon black, finely divided silica, hydrated alumino-silica, kaolin clay, attapulgite clay and talc, to the olefin polymer and adsorbing up to about 0.25 per cent by weight of water onto the hygroscopic filler-polymer blend.

3. A method of claim 2 wherein said hygroscopic filler is carbon black.

4. A method of producing a surface simulating wood on articles of olefin polymer comprising the further treatment of the article of claim 1 by staining the textured surface with wood stain.

5. A method of claim 1 wherein the olefin polymer has a melt index between about 0.1 and about 0.8 and a density of about 0.920 to about 0.980.

6. A method of claim 6 wherein the olefin polymer is selected from homopolymers and copolymers of olefins having from two to six carbon atoms.

7. A method of claim 2 wherein from about 0.5 to about 4 per cent by weight hygroscopic filler based on the total blend is added to the olefin polymer.

* * * * *